United States Patent [19]

Thackery

[11] 3,993,113

[45] Nov. 23, 1976

[54] LOG SPLITTING APPARATUS

[76] Inventor: Russell H. Thackery, 2376 Brentwood Road, Columbus, Ohio 43209

[22] Filed: May 19, 1975

[21] Appl. No.: 578,539

[52] U.S. Cl. .............................. 144/194; 144/193 D; 74/15.69; 180/53 WA

[51] Int. Cl.[2] ...................... B27L 7/00; F16H 37/00; B60J 25/08

[58] Field of Search ........ 144/193 R, 193 A–193 K, 144/194, 195, 3 K; 180/53 A, 53 B, 53 D, 53 WA; 74/13, 15, 15.6, 15.69

[56] References Cited

UNITED STATES PATENTS

| | | | |
|---|---|---|---|
| 1,407,533 | 2/1922 | Hensley | 74/15 X |
| 2,137,940 | 11/1938 | Goodman | 180/53 WA |
| 2,568,076 | 9/1951 | Lewus | 74/13 |
| 2,733,612 | 2/1956 | Sterkel | 180/53 WA |
| 3,670,789 | 6/1972 | Long | 144/193 D |

*Primary Examiner*—Gary L. Smith
*Attorney, Agent, or Firm*—Palmer Fultz

[57] ABSTRACT

A log splitting apparatus for attachment to the powered wheel of a vehicle characterized by a base portion for removable attachment to the vehicle wheel, and an outer rotary end portion provided with a tapered auger means adapted to penetrate and effect splitting of logs.

4 Claims, 4 Drawing Figures

FIG 1-A

LOG SPLITTING APPARATUS

BACKGROUND OF THE INVENTION

This invention relates to log splitting machines and more particularly to a simple log splitter device that is adapted for detachable mounting on the powered wheel of a vehicle.

SUMMARY OF THE INVENTION

In general, the present invention comprises a novel log splitting apparatus that meets the needs of the majority of people engaged in the preparation of firewood from logs on a full but limited basis or on a part-time basis who cannot afford equipment currently available to mechanically split the logs. This invention enables the application of sources of power already owned by or available to the above people to the splitting of logs. This invention by so eliminating as of présent the need to purchase additional power sources as part of a log splitting system results in a much less expensive system. For example, an individual who uses a ¾ ton pickup truck in his wood splitting activities has as much power available as is found on the most expensive and largest log splitters. By means of this invention the full amount of this power can be readily applied to the splitting of logs providing an individual the ability to own the equivalent of previously available units (log splitters) of equal power at one-tenth the cost. The utility and economics of this invention although directed toward the small business operator is in no way limited to the small business operator for its efficiency and capabilities can equal the most elaborate and powerful system on the market today; and, therefore, can be well utilized by the large log splitting industries in the preparation of firewood, fence posts, etc. The present invention can equally well use the power available from garden and farm tractors of all sizes, automobiles of all sizes, pickup trucks, van vehicles, sports cars, light and heavy duty trucks of all sizes and makes.

The present invention can also be successfully applied to use the power available from commercially available chain saws and motorized post hole diggers.

The present invention is comprised of a metal cone with a groove being spirally formed on the surface to form a large tapered screw. To the large end of this screw or head of the unit is fastened (affixed) axially a shaft of suitable material and length. This shaft terminates in an adapter which enables this entire assembly to be affixed to the hub center of any driving wheel, power take off shaft or other rotating power source on garden and farm tractors of all sizes, automobiles of all sizes, pickup trucks, van vehicles, sports cars, and light and heavy duty trucks of all sizes and makes.

This device is attached to a driving wheel, etc. by means of axle hub bolt or wheel lug bolts and is quickly and easily mountable and demountable without necessary alteration of the vehicle parts.

When this tapered screw by means of the shaft and adapter is affixed to a rotating power source the tapered screw will rotate axially with the rotating power source in a direction so that when the log of wood is held against the tip of the rotating tapered screw it will be driven into the wood resulting in splitting of the wood.

In practice the diameter, length, and taper of the tapered screw portion may be designed to most efficiently utilize the available power. For example, a source of minimal power can best be utilized by a long slender cone whereas a large power source can best be utilized by a short steeply tapered cone.

In practice, when the power source is a vehicle wheel or garden or farm tractor wheel a suitable method of supporting and raising the driving wheel off of the ground in a manner to provide stability and safety is a useful part of this invention.

It is, therefore, a primary object of the present invention to provide a novel log splitting attachment for a vehicle wheel which utilizes the existing power source of the vehicle for inexpensively effecting efficient log splitting operations.

It is another object of the present invention to provide a log splitting apparatus of the type described that includes a rotary splitting head which functions in combination with a vehicle axle supporting means for safely adapting a conventional vehicle for use in log splitting operations.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 1-A is a partial sectional view showing a stud extender comprising a portion of the present invention;

DESCRIPION OF THE PREFERRED EMBODIMENT

Figure 1:
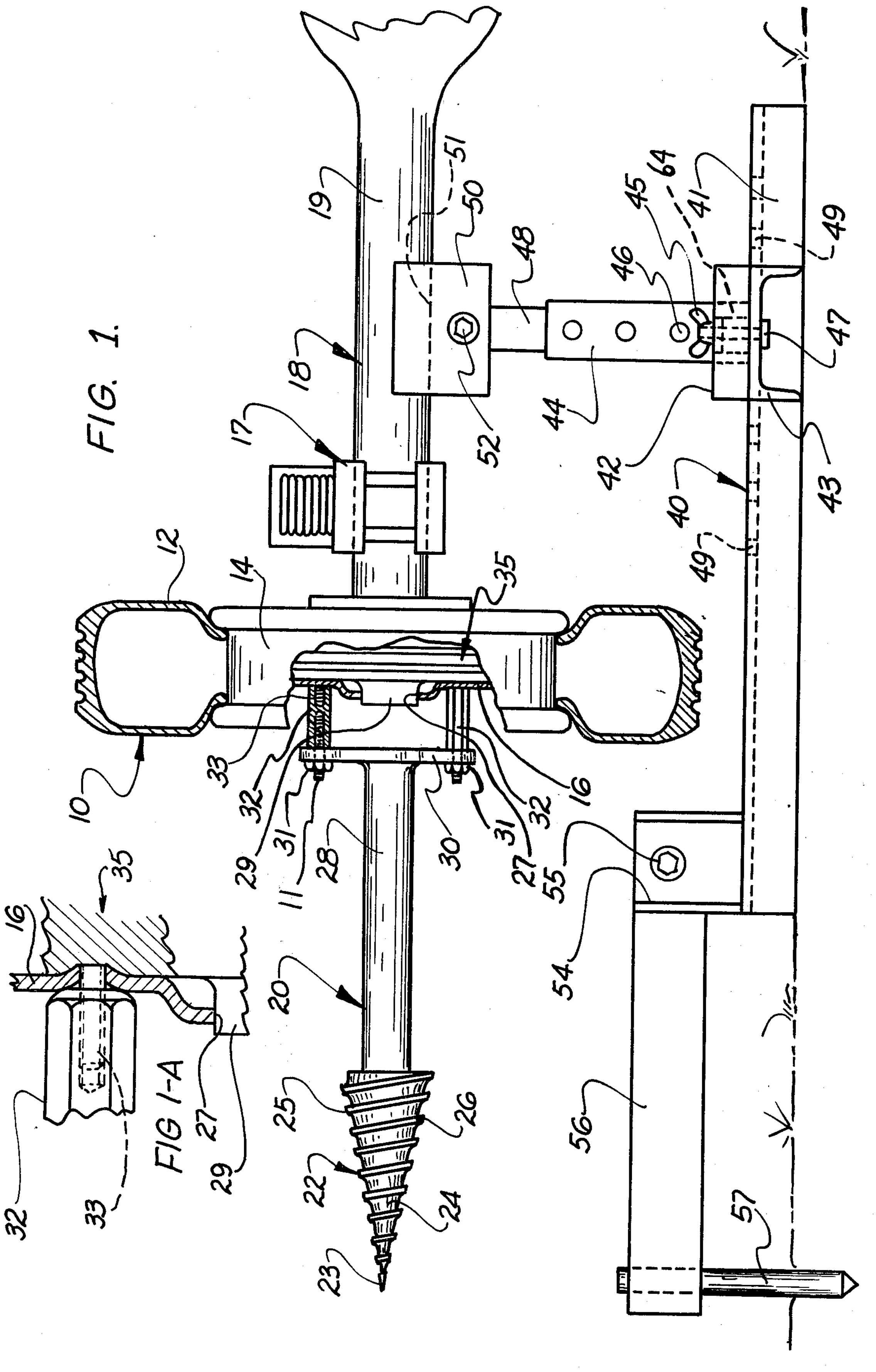
FIG. 1 is a side elevational view, partially in section, of a log splitting apparatus constructed in accordance with the present invention.

Referring in detail to the drawings, FIG. 1 illustrates a log splitting apparatus constructed in accordance with the present invention which comprises a body means indicated generally at 20 that includes a shank portion 28 and a base plate 30, the latter being removably attachable to conventional lug bolts 33 which extend from the hub portion indicated generally at 35 of a conventional vehicle drive wheel 10 which includes the usual rim 14 and tire 12.

As is best seen in FIG. 1-A driven wheel 10 further includes the conventional central disc portion with a central hole 27 that slips over a central hub protrusion 29.

The attachment apparatus of the present invention includes special stud extenders 32 each of which includes on one end female threads for receiving the conventional wheel studs 33 and on the other end female threads for receiving a male threaded member 11 which member 11 is adapted to receive a nut 31 on the other end. Nuts 31 removably secure the previously mentioned base plate 30 to the outer ends of the stud extenders.

It should be mentioned that stud extenders 32 include conventional flats for the attachment of a wrench to tighten and loosen same.

With continued reference to FIG. 1, the outer end of body means 20 includes a conical splitting head 22 provided with a sharpened tip 23 and outer surface 24 that includes a spiral auger 26 of progressively greater diameter proceeding from the tip inwardly.

The rear outer corners 25 of the spiral auger 26 are also preferably sharpened to increase the efficiency the splitting head 22.

Figure 2:
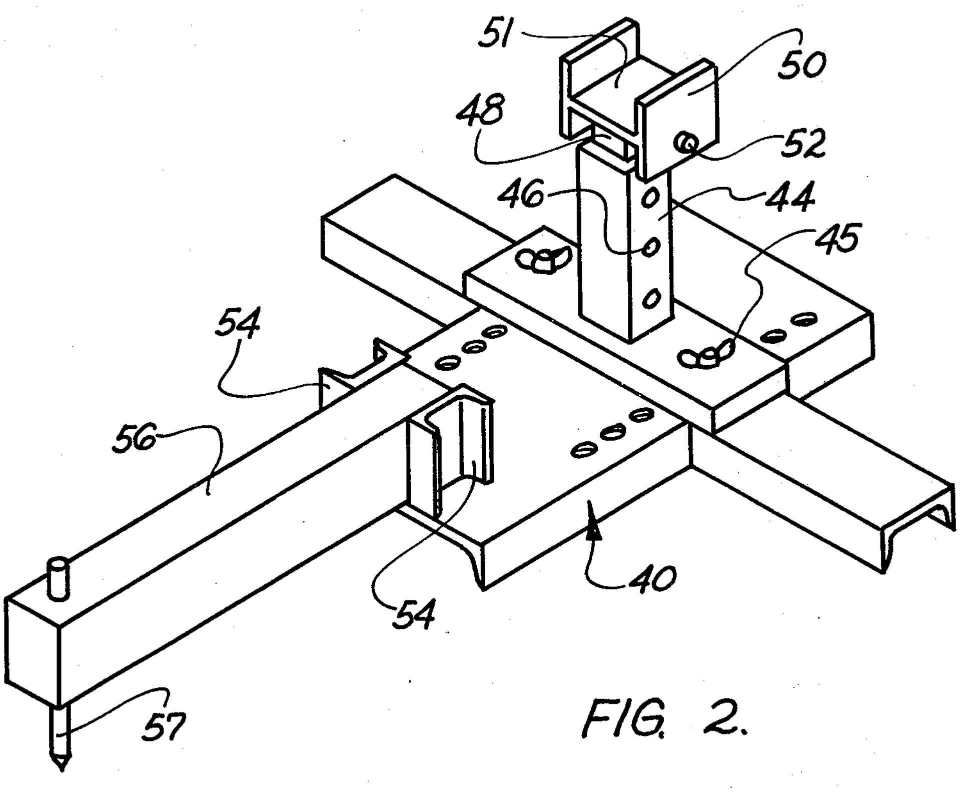
FIG. 2 is a perspective view of a vehicle axle supporting means comprising a portion of the apparatus of FIG. 1.

Reference is next made to FIGS. 1 and 2 which illustrate a vehicle axle supporting means indicated generally at 40 which includes a supporting base 41 and a telescoping upright post 44-48, the latter including a cradle 50 forming a U-shaped trough 51 for receiving a housing 19 of a conventional axle assembly 18 with the latter supporting the vehicle body at the spring assembly 17.

It should be mentioned that the upright post assembly 44-48 can be adjusted to various heights by means of a plurality of holes 46 into which a removable locking pin is selectively inserted.

For purposes of compactness, the upright post assembly 44-48 includes a base portion 42 which can be detached from base means 40 by removing the wing nuts 45 from bolts 47.

It will further be noted that base means 40 includes a plurality of holes 49 which permit the upright post assembly to be positioned at various locations along base means 40.

The outer end of the base means includes an arm 56 which extends beneath the body means 20 and a splitting head 22 and includes a ground spike 57.

It will be further noted that upright post assembly 44-48 fits in a socket 64 in base portion 42 which socket 64 is of square cross section conforming to the shape of the post.

It will also be noted from FIG. 1 that arm 56 is pivotally mounted to the base means by a bolt and nut assembly extended through space bracket 54. Here again, in the interest of compactness, the arm 56 can be pivoted to a position overlying the base means for storage purposes.

It will be noted that base plate 30 is preferably provided with a plurality of sets of lug holes, with each set of lug holes being precisely positioned to register with a different standard automotive wheel lug spacing. Hence, it will be understood that a single body means 20 with its integral multiple purpose base can be used on many different models of vehicles in common use.

In operation, the vehicle is jacked up so that the base means can be positioned under the axle with the axle housing 18 resting in the channel 51 and with the tire 12 clearing the base means. The vehicle engine is then started, whereby the vehicle engine will rotate body means 20 in a counter-clockwise direction as viewed from the tip of the splitting head so as to cause the auger 26 to draw the cone shaped head into the log thereby splitting the log along the grain structure being penetrated.

It should further be mentioned that the previously described arm 56 extending from the base means 40 is extended beneath the splitting head 22 so as to function as an arresting means for the lower end of a log to prevent rotation thereof as the head bites into the side of the upper end of the log.

Figure 3:
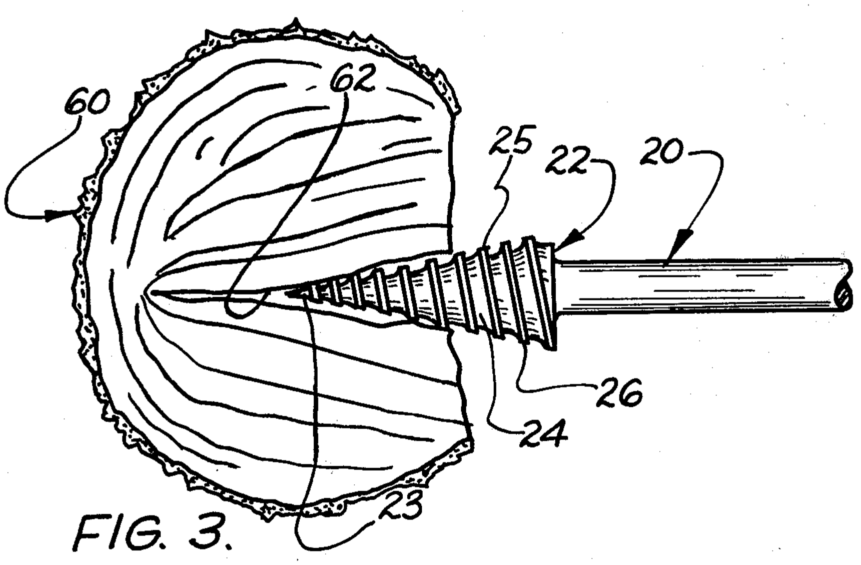
FIG. 3 is a side elevational view of a portion of the log splitting apparatus during a log splitting operation.

As seen in FIG. 3, the log is positioned, relative to the cutter, such that the longitudinal axis of the log is generally perpendicular to the axis of rotation of the splitting head and the side of the upper end of the log is manually forced inwardly against the tip 23 of the head.

It will further be understood that the lower end of the log away from the piercing point must in some way be restrained against torque either by manual retention, engagement with arm 56, or the surface of the ground.

It will also be understood that the log splitting apparatus can be used with or without the particular axle supporting means shown in FIG. 2 without departing from the spirit of the invention. For example, cement blocks could be placed under the axle.

While the form of embodiment of the present invention as herein disclosed constitutes a preferred form, it is to be understood that other forms might be adopted.

What is claimed is:

1. A log splitting apparatus comprising, in combination, a driven vehicle hub provided with a plurality of lug bolts spaced radially outwardly from the axis of rotation of the hub; supporting means for maintaining said driven hub in a position raised off the ground; log splitter body means including a base portion and a generally cone-shaped end portion including a sharpened tip and an outer cone surface provided with a spiral auger portion that increases in diameter inwardly from said tip; and a plurality of lug bolt extenders, each of whch includes an inner end attached to a respective one of said lug bolts and an outer end attached to said base portion by a threaded fastener means for removably mounting said log splitter body means to said vehicle hub.

2. The apparatus defined in claim 1 that includes a vehicle axle supporting means including an axle supporting base, an upright post portion extending upwardly from an inner end of said supporting base for engaging the axle housing of the wheel, and a log arresting arm portion extending outwardly beneath said vehicle wheel and body means.

3. The apparatus defined in claim 2 that includes an adjustable mounting means for selectively positioning said upright post portion at various locations on said supporting base.

4. A log splitting apparatus comprising, in combination, a driven vehicle wheel hub provided with a plurality of threaded wheel attachers having thread means for removably attaching the wheel and circumferentially spaced around the axis of rotation of the hub; supporting means for positioning said hub at a location above the ground; log splitter body means including a base portion and an outer end portion provided with a sharpened tip and a spiral auger portion between said base portion and said tip; attaching means for removably said body means on said hub and including a base plate extending radially from the base portion of the body means and including a plurality of peripherally spaced holes that register with said threaded wheel attachers on the hub; and a plurality of threaded fasteners extended through said holes for removably securing said base plate to said threaded wheel attachers.

* * * * *